United States Patent [19]

Shibaoka

[11] Patent Number: 4,995,738
[45] Date of Patent: Feb. 26, 1991

[54] DOCUMENT PROCESSING APPARATUS WITH AUTOMATIC HYPHENATION DURING EDITING

[76] Inventor: Hideo Shibaoka, c/o Canon Kabushiki Kaisha: 30-2, 3-chome, Shimomaruko, Ohta-ku, Tokyo, Japan

[21] Appl. No.: 437,782

[22] Filed: Nov. 21, 1989

Related U.S. Application Data

[63] Continuation of Ser. No. 170,357, Mar. 18, 1987, abandoned.

[30] Foreign Application Priority Data

Mar. 23, 1987 [JP] Japan .................................. 62-65692
Mar. 23, 1987 [JP] Japan .................................. 62-65693

[51] Int. Cl.$^5$ ............................................. B41B 1/04
[52] U.S. Cl. ......................................... 400/7; 400/83; 364/225.7
[58] Field of Search ......................... 400/83, 7, 3, 64; 364/225.6, 225.7

[56] References Cited

U.S. PATENT DOCUMENTS

| | | | |
|---|---|---|---|
| 3,529,296 | 9/1970 | Friedman et al. | 400/7 |
| 4,139,902 | 2/1979 | Bodin | 400/7 |
| 4,181,972 | 1/1980 | Casey | 400/7 |
| 4,244,031 | 1/1981 | Izushima et al. | 400/7 |
| 4,354,765 | 10/1982 | Buchanan et al. | 400/7 |
| 4,556,332 | 12/1985 | Maekawa | 400/3 |
| 4,574,363 | 3/1986 | Carlgren et al. | 400/7 |
| 4,678,351 | 7/1987 | Curley | 400/7 |
| 4,742,485 | 5/1988 | Carlson et al. | 400/83 |

FOREIGN PATENT DOCUMENTS 217179 10/1985 Japan .................................. 400/64

OTHER PUBLICATIONS

"User-Controlled . . . Text Document", IBM Technical Disclosure Bulletin, vol. 30, No. 4, pp. 1562-1565, 9/87.
McCray, "Multiple Use . . . Hyphens", IBM Technical Disclosure Bulletin, vol. 25, No. 11B, p. 6248, 4/83.
"Right Margin Controls", Bartlett et al., IBM Technical Disclosure Bulletin, vol. 27, No. 1A, pp. 126-128, 6/84.

Primary Examiner—Eugene H. Eickholt

[57] ABSTRACT

A document processing apparatus which can hyphenate the input document information and can display and print the hyphenated document in the same form is provided. This apparatus includes: a memory device having a document memory unit to store character code information corresponding to input document information and a hyphen inserting position memory unit to respectively store the hyphen inserting position information of each word consisting of a set of the character code information stored in the document memory unit; a display unit to display the input document information; a line end input detecting circuit to detect the line end character by sequentially monitoring on a character unit basis the document input generating state of a word exceeding the line end on the display device during the document inputting operation; and a display control circuit for referring to the hyphen inserting position information stored in the hyphen inserting position memory unit after completion of the input of the word in which the character detected by the line end input detecting circuit is used as an element, for inserting a hyphen character into the word exceeding the line end on the display means, and for separately displaying this word on two lines through the hyphen.

8 Claims, 7 Drawing Sheets

FIG. 2

```
L                                                    R
─────────────────────────────────────────────────────
     However, the lure of lucre evidently
prevailed, for Higashiyama Kyoto ordered the
production of the same material for sales to
plebeian customers.
```
11

12

```
L                                                    R
─────────────────────────────────────────────────────
     However, the lure of lucre evidently pre-
vailed, for Higashiyama Kyoto ordered the produc-
tion of the same material for sales to plebeian
customers.
```

FIG. 5

| | | |
|---|---|---|
| ↓ | However, the lure of lucre evidently pre | ~$L_1$ |
| ↓ | However, the lure of lucre evidently prev | ~$L_2$ |
| ↓ | However, the lure of lucre evidently preva | ~$L_3$ |
| ↓ | However, the lure of lucre evidently prevai | ~$L_4$ |
| ↓ | However, the lure of lucre evidently prevail | ~$L_5$ |
| ↓ | However, the lure of lucre evidently prevaile | ~$L_6$ |
| ↓ | However, the lure of lucre evidently prevailed | ~$L_7$ |
| | However, the lure of lucre evidently pre- | ~$L_8$ |
| vailed, | | ~M |

However, the lure of lucre evidently prevailed, for Kyoto Higashiyama ordered the production of the same material for sales to plebeian customers.

However, the lure of lucre evidently prevailed, for Kyoto Higashiyama ordered the production of the same material for sales to plebeian customers.

However, the lure of lucre evidently prevailed, for Kyoto Higashiyama ordered the production of the same material for sales to plebeian customers.

DOCUMENT PROCESSING APPARATUS WITH AUTOMATIC HYPHENATION DURING EDITING

This application is a continuation of application Ser. No. 170,357 filed Mar. 18, 1987, now abandoned.

BACKGROUND OF THE INVENTION

1. Field of the Invention

The present invention relates to a document processing apparatus for displaying and printing character information which is input and, more particularly, to a document processing apparatus which can hyphenate input character information and then display and print.

2. Related Background Art

Hitherto, in document processing apparatuses, e.g., electronic typewriters and the like, can perform multifunctions so that an input document can be stored, variably edited, and printed, and the document can be printed with a high quality by a daisy wheel or the like.

In such apparatus, in general, an operator performs the document editing process while looking at document information which is displayed on a display device. However, in recent years, the display device to display input document information has been enlarged more and more. An apparatus which can display an input document in a format approximately the print style has also been developed.

However, when an input document is a document based on a foreign language which is constituted by, for example, 26 alphabetic characters, it is necessary to perform a word wrap which is peculiar to the language. Namely, when a word consisting of a series of input characters is input so as to exceed the set right margin, the word exceeding the right margin is automatically moved to the head of the next line.

However, when a sentence including words each consisting of a number of characters is input, the words are frequently wrapped, so that the print style of the words near the right margin becomes very uneven and the print image of the document is poor.

To prevent such a drawback, there has been developed an apparatus in which information relating to the ends of input document, namely, hyphen insertion information, is previously stored, and when the printing of the input document information is executed by designating the printing mode, an automatic hyphenating process to print by inserting a hyphen can be executed.

However, the input document is displayed without hyphens. Therefore, the operator who has input the document obtains a printed document different from the displayed document. Thus, there is a problem that the print style which the operator does not want to obtain is derived by the typewriter and the desires of the operator who has input the document cannot be satisfied with high fidelity, so that operability of the device is poor.

As conventional processing styles to display the end of a sentence, styles as shown in FIGS. 8A and 8B are known.

FIGS. 8A and 8B are diagrams for explaining conventional document input display states. In the diagrams, L denotes a left margin and R indicates a right margin.

FIG. 8A shows a screen of the document input state according to a left margin forced hyphen display system. When each character of a word which is input exceeds the right margin R, the keyboard input is locked to instruct the operator to perform the hyphenation. After insertion of a hyphen, the keyboard is unlocked. A hyphen is mechanically inserted without considering the end of word or the like which exceeds the right margin R, so that the sentence is very hard to read.

FIG. 8B shows a screen of the document input state according to a word wrapping system. When even one character of an input word exceeds the right margin R, the word which exceeds the right margin R is automatically moved to the beginning of the next line. If the number of characters of a word increases, for example, when the number of characters of one word is large as in the case of German, the word is certainly wrapped near the right margin R, i.e., it is moved to the head of the next line, so that the display and print styles become uneven.

SUMMARY OF THE INVENTION

In consideration of the foregoing points, it is an object of the present invention to provide a document processing apparatus in which by referring to a memory unit in which correct hyphen inserting positions are stored, even on a display device, it is possible to display a document which was hyphenated in a manner similar to the automatic hyphenation which will be performed upon printing.

In consideration of the foregoing points, it is another object of the invention to provide a document processing apparatus in which when a document display request is instructed, a dividable form of a word is discriminated in which a character at the end of a line in document information which is read out of document memory means on the unit basis of the maximum number of characters which can be displayed in one line of a display device is used as an element. Further, on the basis of the word dividable form of the line end character, display control means refers to the hyphen inserting position information of the word which is stored in hyphen inserting information memory means and allows the word which will appear at the end of a line and at the head of the next line on the display device to be displayed by inserting a hyphen therebetween.

Still another object of the invention is to provide a document processing apparatus for performing a hyphenating process when a document is edited.

Still another object of the invention is to provide a document processing apparatus for performing a hyphenating process when a form is changed.

Still another object of the invention is to provide a document processing apparatus which can switch a word wrapping display and a hyphenation display.

BRIEF DESCRIPTION OF THE DRAWINGS

FIG. 2 is a diagram for explaining document display styles which are displayed in a display unit shown in FIG. 1;

FIG. 5 is a sentence display change diagram in a display unit 6 shown in FIG. 4;

FIG. 7 is a diagram showing an example of the hyphenation display operation according to the invention; and FIGS. 8A and 8B are diagrams for explaining conventional document input display states.

DETAILED DESCRIPTION OF THE PREFERRED EMBODIMENTS

Figure 1:
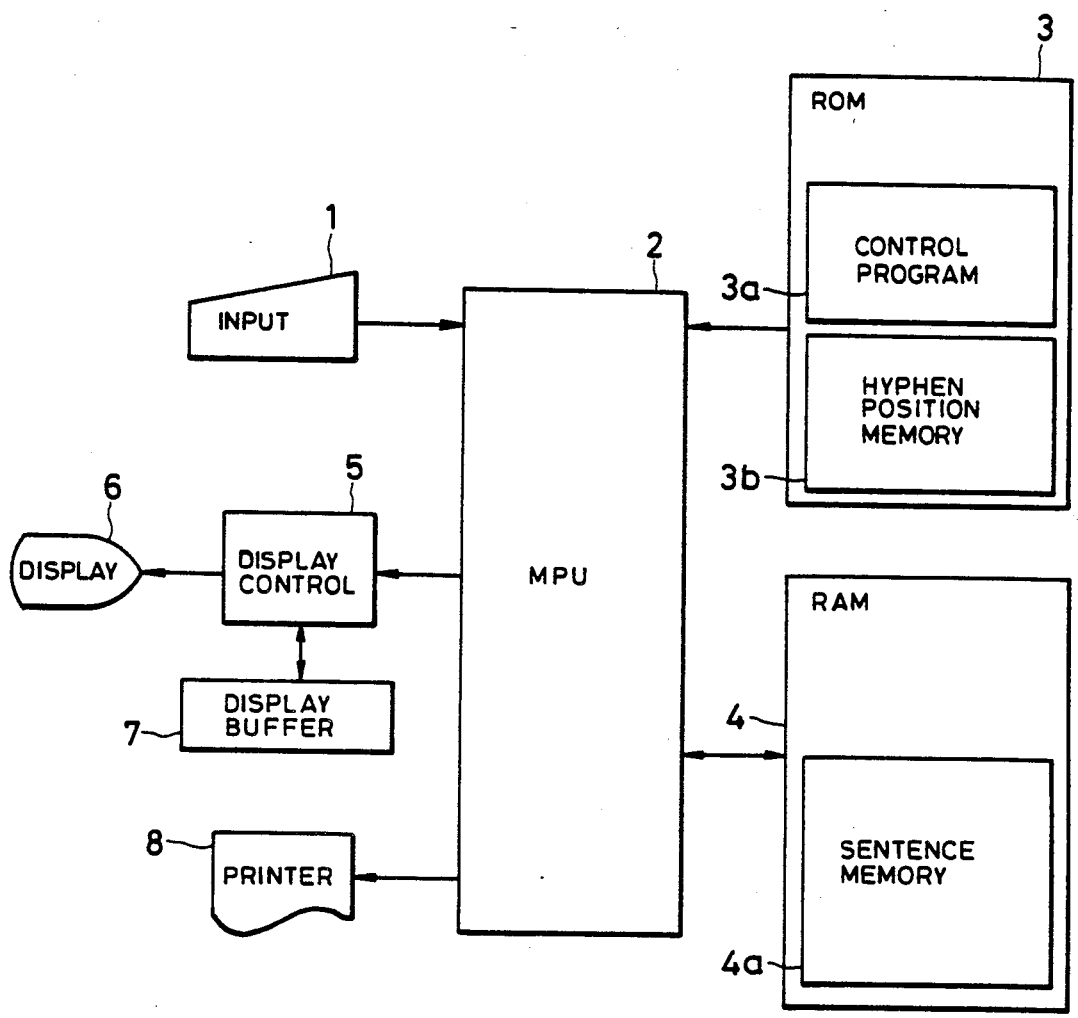
FIG. 1 is a block diagram for explaining an arrangement of a document processing apparatus showing an embodiment of the present invention.

FIG. 1 is a block diagram for explaining an arrangement of a document processing apparatus showing an embodiment of the present invention. Reference numeral 1 denotes an input unit consisting of, e.g., a keyboard. By depressing a character key or a symbol key, key code data corresponding to the depressed key is output to an MPU 2 such as a microprocessor. In addition, the editing such as correction, addition, and the like, and the change of a form can be also performed on display means, which will be explained hereinafter. Data transmitted from, e.g., a memory device such as a floppy disk or from a communication apparatus may be substituted for the input unit 1. The input unit 1 has a command key to instruct the execution of the hyphenation display or a command key to instruct the execution of the word wrapping display or the like, which will be explained hereinafter. These display modes can be also switched by a single key. A ROM 3 comprises a control program 3a for the MPU 2, a hyphen position memory unit 3b to store hyphen inserting position information of various kinds of words consisting of a set of character code information, and the like. A RAM 4 functions as a work memory of the MPU 2. The RAM 4 has a sentence memory 4a to temporarily store the character code train or the like which is converted from the key codes input from the input unit 1. A display control unit 5 serves as hyphen display control means of the invention and allows a display unit 6 to display the display information stored in a display buffer 7. The MPU 2 serves as dividable form discriminating means of the invention. The MPU 2 discriminates the dividable form of a word. The word has a character at the end of a line which is used as an element. The word is part of the document information which is read out of the sentence memory 4a on the unit basis of the maximum number of characters which can be displayed in one line of the display unit 6. On the basis of the word dividable form of the line end character, the MPU 2 refers to the hyphen inserting position information which is stored in the hyphen inserting position memory unit, thereby allowing the display control unit 5 serving as the display control means to display the word which will appear at the end of a line and at the beginning of the next line on the display unit 6 by inserting a hyphen therebetween. The document information which is read out of the sentence memory 4a by the MPU 2 is printed by a printer 8 on the basis of predetermined print control information.

The hyphen display control operation according to the invention will now be described with reference to FIGS. 2 and 3.

FIG. 2 is a diagram for explaining a document display style which is displayed by the display unit 6 shown in FIG. 1. Reference numeral 11 denotes a document display screen according to the word wrapping system, and 12 indicates a hyphen display screen. L represents the left margin on the display unit 6 and corresponds to the left limit position of a line. R denotes the right margin on the display unit 6 and corresponds to the right limit position of a line. Even when the display unit 6 has a display capacity as much as only one line, the invention can be also applied.

Figure 3:
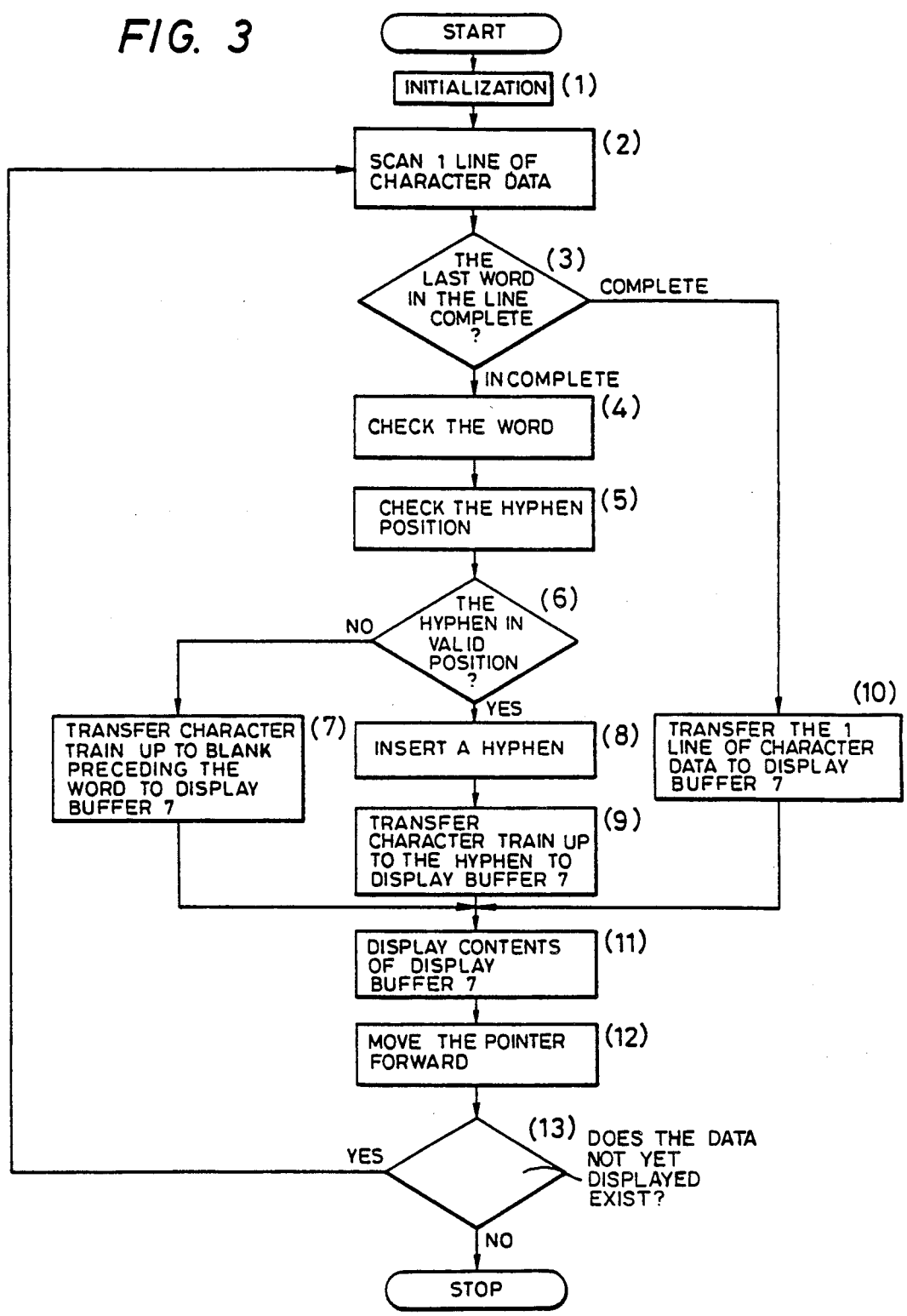
FIG. 3 is a flowchart for explaining a hyphen display control operation for document information according to the invention.

FIG. 3 is a flowchart for explaining the hyphen display control operation of document information according to the invention. Reference numerals (1) to (13) indicate steps. In a document processing apparatus such as an electronic typewriter, an explanation will now be provided with respect to an example in the case where a power source is turned on and the display style of the document display screen 11 shown in FIG. 2 is changed to the hyphen display style from the word wrapping display style (the display form in which at the end of a word such as a blank preceding a word, this word is automatically moved and displayed from the beginning of the next line) on the display unit 6.

When the command key to instruct the execution of the hyphenation display is input from the input unit 1, this processing routine is started. Various kinds of variables are first initialized (step 1). At this time, the distance between the right and left margins is calculated. Next, the MPU 2 reads out a character train of a length corresponding to the distance between the right and left margins from the sentence memory 4a and the character data of one line in the text are scanned (step 2). A character which will be the last character of a line, namely, a character which exceeds the right margin R is searched. In this display example, this character corresponds to "a" as an element of a word "prevailed". Next, a check is made to see if the word element "a" existing at the position of the right margin R is an intermediate character of the word "prevailed" or not (in other words, the dividable form of a word having the line end character as an element is discriminated) (step 3). If YES, namely, when the word "prevailed" is displayed on this line and the next line (divisional display), the MPU 2 checks the word including the last character of the line (the word using the line end character as an element) (step 4). A word is defined as a character train sandwiched by the ends of words and consists of characters other than a blank code and a command code serving as the end of the word. Therefore, after the MPU 2 further eliminates the characters such as symbol, numeral, or the like from the word, the MPU 2 refers to the hyphen position memory unit 3b and reads out the hyphen position information therefrom on the basis of the character train constituting the word. The correct hyphen position information corresponding to each of various kinds of words are stored in the hyphen position memory unit 3b as a bit map in which one bit is provided for one hyphen position. An arbitrary word can be searched in accordance with the kind of character codes constituting the word. If the searched word is a proper noun or the like and the hyphen position information thereof is not stored in the hyphen position memory unit 3b, the bit map such that no hyphen can be inserted is obtained (step 5).

As the result of the search in step (5), a check is then made to see if the position where a hyphen can be inserted into the searched word exists or not. At the same time, a check is made to see if the position where a hyphen can be inserted is located on the left side of the right margin R, that is, whether the hyphen position is located at the valid position or not (step 6). If NO, the character train up to the blank preceding the word is transferred to the display buffer 7 (step 7), Then, the processing routine advances to step (11) and subsequent steps (this flow is the same as the conventional word wrapping display). If YES, in this embodiment, a hyphen can be inserted to the position between "pre" and "vailed" of the word "prevailed" and the hyphen inserting position exists on the left side of the word element "a" on the right margin R. Therefore, a hyphen character "-" is inserted into the relevant position of the word "prevailed" (step 8). The character train from the head of the line to the hyphen character on the display unit 6, namely, "however . . . pre-" is transferred to the display buffer 7 through the display control unit 5 (step 9).

On the other hand, if NO in the discriminating step (3), that is, if the end of a word or the last character of a word is located at the right margin R, in this embodiment, this case corresponds to the word element "n" of the first word "plebeian" at the third line from the top on the document display screen 11. In this case, the character train "tion . . . plebeian" of one line is transferred to the display buffer 7 through the display control unit 5 (step 10).

Subsequently, in order to display the character train stored in the display buffer 7 on the display unit 6, for example, as shown on a hyphen display screen 12 in FIG. 2, the hyphen character "-" is inserted after the word element "pre" of the word "prevailed" on the relevant line and displayed (step 11). Next, a variable (pointer) to instruct the head of the data which is not yet displayed is moved to a character "v" of the word "prevailed" (step 12). A check is made to see if data which is not displayed yet exists or not (step 13). If YES, step (2) follows. If NO, the hyphen display control is finished.

By controlling the display mode to three forms (the word wrapping style, hyphenation style, and style to display as it is) on the basis of the results of the discrimination (in steps 3 and 5), the hyphen display screen 12 is displayed on the display unit 6 as shown in FIG. 2. The input document information can be displayed by displaying the word exceeding the line end in the same form as the hyphen integration printing style by the printer 8 in accordance with the dividable form of the word which exceeds the right margin R.

When an operator performs a correcting, changing, or adding process to the document which was automatically or manually hyphenated by the operator, the form of the input document after the change position is broken. Therefore, on the basis of the execution state of the correction or editing of the input document information, the hyphenation which has already been performed is made invalid or a new hyphenating process is automatically executed. By doing this, the document can be further efficiently input and edited.

On the other hand, even in the case where the form of the margin, indent, or the like of the document information which has already been input is changed, the character which will reach the line end changes, so that the hyphenation which has already been performed becomes meaningless. To solve this problem, by executing the hyphen display control shown in FIG. 3 on the basis of the form changed, the operator can continuously edit the document without being conscious of the end of the word which reaches the line end. The document can be printed in a desired document display form.

On the other hand, the hyphenation display mode and word wrapping display mode can be properly switched by the command key. The control unit controls so as to execute the program of FIG. 3 when editing is performed, the form is changed, or the display mode is changed as mentioned above.

As described above, according to the invention, there are provided dividable form discriminating means for discriminating the dividable form of a word. The word has a line end character which is used as an element. The word is part of document information which is read out of document memory means on the unit basis of the maximum number of characters which can be displayed on one line of a display unit. Also provided is display control means for referring hyphen inserting position information which is stored in hyphen inserting information memory means on the basis of the word dividable form of the line end character which is determined by the dividable form discriminating means, and for displaying the word which will appear at the end of a line and at the head of the next line on the display unit by inserting a hyphen therebetween. Therefore, there are the following excellent advantages. Namely, when the input document information is displayed, if the input word is divided by the set right margin, the input document can be displayed in the same form as the hyphen character insertion printing style. The same document information as that in the display style can be printed and output. An operator can continuously input a document without being conscious of the troublesome hyphen inputting process at the line end. Therefore, document input efficiency can be remarkably improved.

Figure 4:
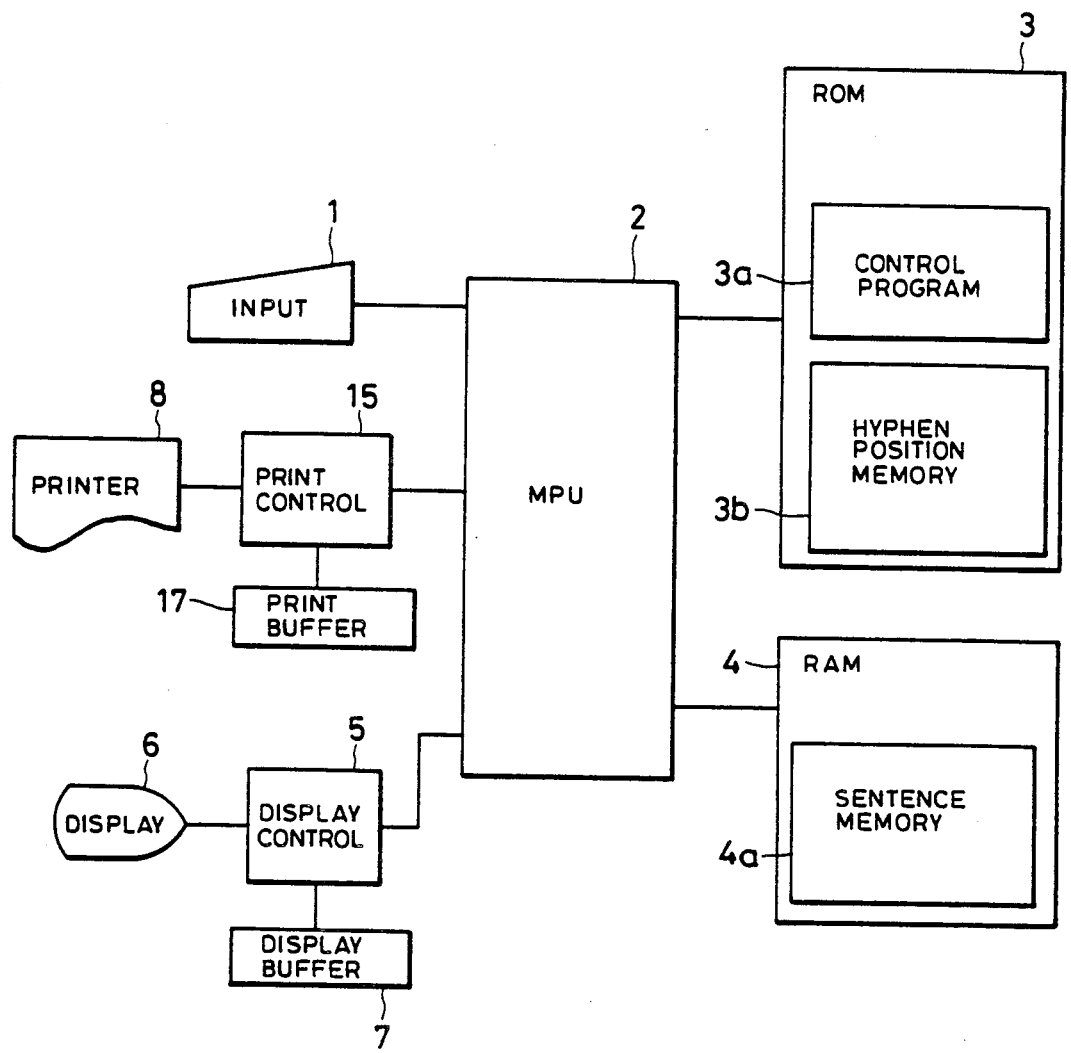
FIG. 4 is a block diagram for explaining an arrangement of a document processing apparatus showing another embodiment of the invention.

FIG. 4 is a block diagram for explaining an arrangement of a document processing apparatus showing another embodiment of the invention, in which the same parts and components as those shown in FIG. 1 are designated by the same reference numerals. That is, the input unit 1 consists of, e.g., a keyboard. By pressing a character key or a symbol key, the input unit 1 outputs the key code data corresponding to the depressed key to the MPU 2 such as a microprocessor. data transmitted from, for instance, a memory device such as a floppy disk or from a communication apparatus, may be substituted for the input unit 1. The ROM 3 comprises a control program 3a for the MPU 2, the hyphen position memory unit 3b to store the hyphen inserting position information of each word consisting of a set of character code information, and the like. The RAM 4 functions as a work memory for the MPU 2 and has the sentence memory 4a to temporarily store the converted character code train or the like from the key codes which were input from the input unit 1. A print control unit 15 reads out the character code train to be printed and the print control data from the MPU 2, thereby controlling the printing of the printer 8. A print buffer 17 temporarily stores the print information to be printed by the printer 8. The display control unit 5 also serves as the hyphen display control means and allows the display unit 6 to display the display information stored in the display buffer 7. The MPU 2 also serves as the line end input detecting means of the invention and sequentially monitors the input state of a document which exceeds the line end on the display unit 6 on a character unit basis during the document inputting operation. When a character exceeding the line end is detected, after completion of the input of the word including this character as an element, the display control unit 5 refers the hyphen inserting position information stored in the hyphen position memory unit 3b and inserts a hyphen character to the word exceeding the line end on the display unit 6 which is detected by the MPU 2, thereby separately displaying this word on two lines. Even when the display unit 6 has a display capacity as much as only one line, the invention can be also applied.

The display control operation according to the invention will now be described with reference to FIGS. 5 and 6.

FIG. 5 shows a sentence display change diagram on the display unit 6 shown in FIG. 4, in which the left and right margins are designated by the same reference as the margins shown in FIGS. 8A and 8B.

In this diagram, $L_1$ to $L_8$ denote display changes on the same line and illustrate a state in which, e.g., a word "prevailed" is being input. M indicates the display state of the next line.

Figure 6:
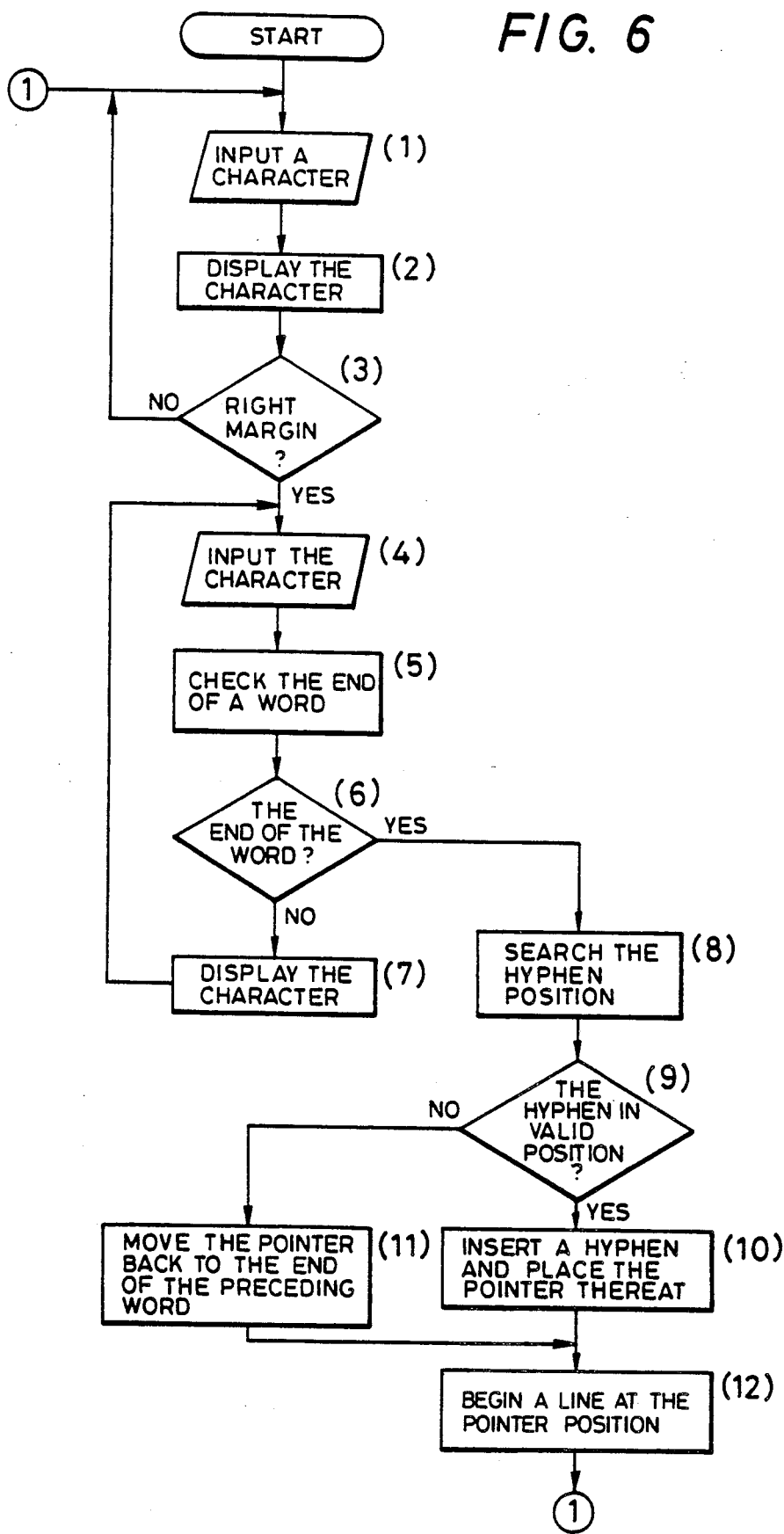
FIG. 6 is a flowchart for explaining a display control operating procedure according to the invention.

FIG. 6 is a flowchart for explaining a display control operating procedure according to the invention. Reference numerals (1) to (12) denote steps. The processes in steps (1) to (12) are stored in the control program 3a shown in FIG. 4.

When the power source is turned on, this flow is started. A check is made to see if a key code has been input from the input unit 1 or not. If the key code has been input, the MPU 2 converts the key code into the character code and stores it in the sentence memory 4a (step 1). Next, the MPU 2 transfers the input character code to the display control unit 5. The display control unit 5 keeps the character code in the display buffer 7 and the input character is displayed by the display unit 6 (step 2). Next, the MPU 2 checks to see if the line which is being input for the character code input in step (1) has a length which exceeds the right limit position, i.e., the right margin or not (step 3). If NO, the processing routine is returned to step (1), If YES, the key code which is at present being input is converted into the character code and the character input is accepted (step 4) in a manner similar to step (1). A check is then made to see if the input character code is the end of a word or not (step 5). As a character code which is not the end of a word, an alphabet of each language, numeral, period, hyphen, apostrophe, or the like can be mentioned. When a character code other than these codes is input, it is regarded as the end of a word and the following processes are executed. Next, a check is made to see if an input character code as the end of a word has been input or not (step 6). If NO, the display control unit 5 allows the display unit 6 to display the input character code (step 7). Then, the processing routine is returned to step (4). That is, the processes are executed in correspondence to steps (1) to (3) until the display changes $L_1$ to $L_3$ shown in FIG. 5. The processes are performed in steps (4) to (7) until the display changes $L_4$ to $L_7$.

On the other hand, if YES in step (6), in order to insert the hyphen "-" to the correct position of the input word, the MPU 2 accesses the hyphen position memory unit 3b in the ROM 3 and searches the hyphen position (step 8). In correspondence to each of various kinds of works, the information of the correct hyphen position is stored in the hyphen position memory unit 3b as a bit map in which one bit corresponds to one hyphen position. An arbitrary word can be searched in accordance with the kind of character codes constituting a word. However, if the searched word is a proper noun or the like and when the hyphen position information thereof is not stored in the hyphen position memory unit 3b, a bit map such that a hyphen cannot be inserted is derived. Therefore, as shown in FIG. 5, in the display change $L_7$, the process in step (8) is executed at the time point when "," as an end of a word is input. The hyphen position of the word "prevailed" is searched. The MPU 2 recognizes that the hyphen position is located between "pre" and "vailed". The processes in step (9) and subsequent steps are executed.

Next, a check is made to see if the searched hyphen position is located at the valid position and at the same time, a check is also made to see if the hyphen position is located on the left side of the right margin R or not (step 9). If YES, a hyphen is inserted to the relevant position and this position is set as the last character of this line into the pointer as a variable (step 10). Then, the processes in step (12) and subsequent steps are executed. If NO, the left end of the word checked is set as the last character of this line into the pointer (step 11). Next, by referring to the values of the point set in steps (10) and (11), a command to begin a new line at the pointer position is sent from the MPU 2 to the display control unit 5. In response to this command, the display control unit 5 controls the display unit 6 to display the divided word from the beginning of the next line (step 12). The information indicative of the movement of the divided word to the next line is stored into the display buffer 10. This state corresponds to the display change $L_8$ and the display state M of the next line shown in FIG. 2.

Thus, an operator can input a sentence without considering the hyphen position inserting process during the inputting operation. The sentence can be printed by the printer 8 in the same form as the document form displayed.

Therefore, as shown in FIG. 7, the input document can be displayed on the display unit 6 in the state in which a hyphen is inserted to the proper position among the characters of a word which exceeds the right margin R in which the position of the right margin R is used as a reference. At the same time, the display document is printed by the printer 8 in the form displayed on the display unit 6.

In the foregoing embodiment, the case where the document data made by the document processing apparatus having the automatic hyphenating function is processed has been described. However, if the document data made by a document processing apparatus or the like which does not have the automatic hyphenating function is stored in the sentence memory 4a, it is once displayed by the display unit 6 on a line unit basis. When the operator recognizes that a long blank exists near the right margin R of the document displayed on the display unit 6 (although a length of blank differs depending on the operator), the cursor is moved to the head of the next line and the operator inputs a command to designate the hyphenating process. By doing this, the next word locating at the beginning of the line can be displayed as a hyphenated word.

On the other hand, if the display form of the word which was hypenated at the end of each line is not performed at a desired position of the operator, by constituting the apparatus in a manner such that the MPU 2 sequentially moves the hyphen between the characters constituting a word in response to a hyphen position selection request which is instructed from the operator so that the operator can select a desired hyphen position, the hyphenating process can be executed at a desired position which is required by the operator.

As described above, according to the invention, there are provided: a display unit to display input document information; line end input detecting means for sequentially monitoring on a character unit basis the document input generating state of a document which exceeds the end of a line on the display unit during the document inputting operation, thereby detecting the character at the line end; and hyphen display control means for referring to hyphen inserting position information stored in hyphen inserting information memory means after completion of the input of a word in which the character which is detected by the line end input detecting means is used as an element, for inserting a hyphen character in the word which exceeds the end of line on the display unit, and for separately displaying this word on two lines. Therefore, there are the following excellent advantages. Namely, the word which exceeds the end of line on the display unit can be displayed through a hyphen in the form corresponding to the print style in parallel with the document which is successively input. A desired document can be continuously efficiently input without performing the hyphenation display operation at the line end by the operator. At the same time, the input document can be printed in the same form as the display style. The document can be output in the state in which the display style and print style are always matched.

What is claimed is:

1. A document processing apparatus comprising:
   memory means for storing document information;
   display means for displaying the document information which is stored in said memory means;
   display control means for controlling said display means so as to add a hyphen at the end of a line on said display means and to control the display of a word contained in the document information; and
   editing means for editing the document information which is displayed by said display means,
   wherein said display control means controls said display means in a manner such that when document editing is performed by said editing means, said display control means again controls said display means to add a hyphen at the end of a line on said display means.

2. An apparatus according to claim 1, further comprising means for switching between a mode for a word wrapping display and a mode for said hyphen character display.

3. An apparatus according to claim 1, further comprising printing means for printing the document information in the same form as that of the document information which is displayed by said display means.

4. A document processing apparatus comprising:
   memory means for storing document information;
   display means for displaying the document information which is stored in said memory means;
   switching means for switching from a mode in which said apparatus performs a word wrapping process at the end of a line to a mode in which said apparatus performs a hyphenating process with respect to the document information to be displayed by said display means;
   editing means for editing the document information on said display means; and
   hyphenation executting means for executing the hyphenating process when said switching means switches to the hyphenating process and when an editing process is executed by said editing means.

5. An apparatus according to claim 4, further comprising printing means for printing the document information in the same form as that of the document information which is displayed by said display means.

6. A document processing apparatus comprising:
   memory means for storing document information;
   display means for displaying the document information which is stored in said memory means on the basis of form information;
   hyphenation processing means for performing a hyphenating process at the end of a line displayed on said display means; and
   change instructing means for instructing a change of the form of the information,
   wherein said hyphenation processing means performs the hyphenating process on the document information which is displayed on the basis of the new form information in response to an instruction from said change instructing means.

7. An apparatus according to claim 6, further comprising means for switching between a mode for a word wrapping display and a mode for said hyphen character display.

8. An apparatus according to claim 6, further comprising printing means for printing the document information in the same form as that of the document information which is displayed by said display means.

* * * * *

UNITED STATES PATENT AND TRADEMARK OFFICE
CERTIFICATE OF CORRECTION

PATENT NO. : 4,995,738

DATED : February 26, 1991

INVENTOR(S) : Hideo Shibaoka

It is certified that error appears in the above-identified patent and that said Letters Patent is hereby corrected as shown below:

COVER PAGE:

Insert --[73] Assignee: Canon Kabushiki Kaisha, Tokyo, Japan--;

[56] Insert --Attorney, Agent or Firm—Fitzpatrick, Cella, Harper & Scinto--.

COLUMN 1:

Line 16, "in" should be deleted.

COLUMN 6:

Line 37, "data" should read "Data".

Signed and Sealed this

Twenty-second Day of October, 1991

*Attest:*

HARRY F. MANBECK, JR.

*Attesting Officer*       *Commissioner of Patents and Trademarks*